United States Patent [19]

Thompson

[11] 4,130,803

[45] Dec. 19, 1978

[54] RADIO EQUIPPED PROTECTIVE HELMET

[76] Inventor: Kenneth L. Thompson, 5201 W. 34th St., #702, Houston, Tex. 77092

[21] Appl. No.: 793,236

[22] Filed: May 4, 1977

[51] Int. Cl.² ............................................. H04B 1/08
[52] U.S. Cl. .................................... 325/361; 325/310
[58] Field of Search .................. 325/15, 16, 361, 318, 325/111, 310, 66, 102, 117–119; 179/1 SW, 1 VE, 156 R, 156 A, 157

[56] References Cited

U.S. PATENT DOCUMENTS

| | | | |
|---|---|---|---|
| 2,619,639 | 12/1952 | Hendler | 179/156 A |
| 2,904,645 | 9/1959 | Sarles | 325/361 |
| 3,088,002 | 4/1963 | Heisig | 179/156 R |
| 3,091,771 | 6/1963 | Bixby | 179/156 R |
| 3,218,607 | 11/1965 | Brock et al. | 325/16 |
| 3,586,977 | 6/1971 | Lustig et al. | 325/111 |
| 3,916,312 | 10/1975 | Campbell | 325/16 |
| 4,077,007 | 2/1978 | McKinney | 325/361 |

FOREIGN PATENT DOCUMENTS

| | | | |
|---|---|---|---|
| 936921 | 11/1973 | Canada | 325/16 |
| 2231164 | 5/1973 | France | 325/16 |

OTHER PUBLICATIONS

The Radio Hat, Radio Electronics, Jun. 1949, pp. 32-33.

Primary Examiner—Robert L. Griffin
Assistant Examiner—Tommy P. Chin

[57] ABSTRACT

A protective helmet having thick padding adhesively attached to its inner periphery so as to completely engage the wearers head — forehead, temples, sides and back thereof including the neck — and being thick enough to enclose and cushion a radio, battery and earphone and still provide adequate cushioning protection, and to the lining per se.

1 Claim, 6 Drawing Figures

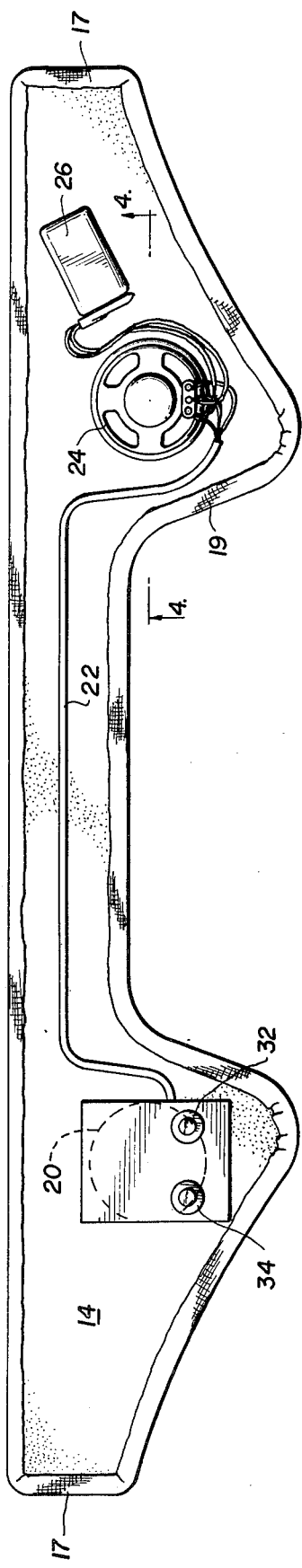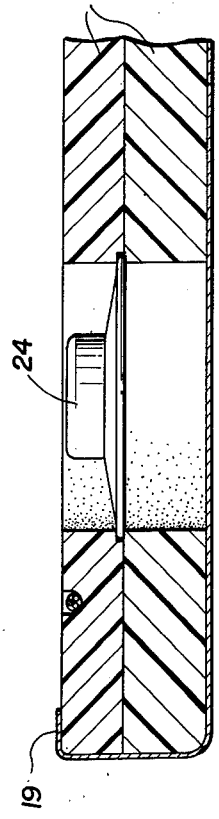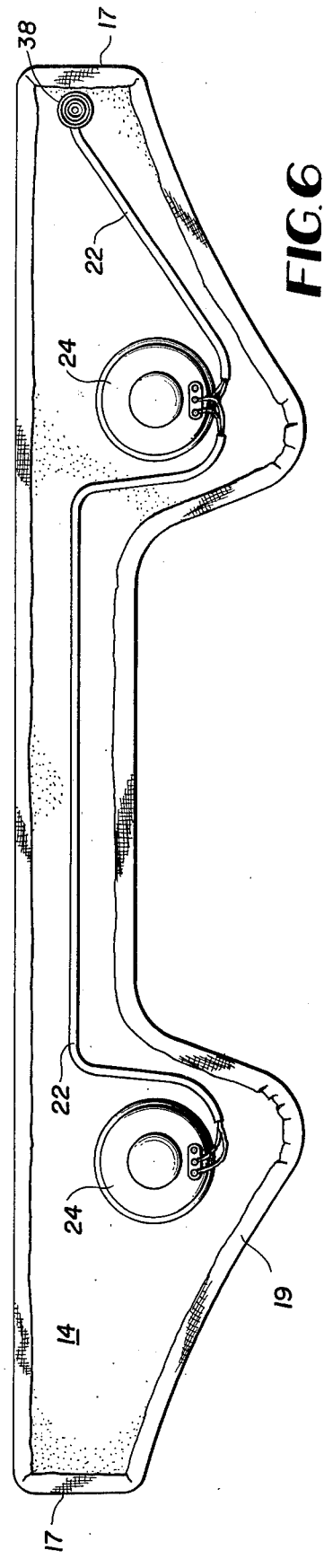

RADIO EQUIPPED PROTECTIVE HELMET

This invention relates generally to protective head gear and more particularly to a rigid, hard shell helmet having a cushioning lining to protect the head and neck of the wearer, and to the lining per se.

Helmets of this general type are well known in the art, are usually worn by motorcyclists, football players, etc., and are usually characterized by an unnecessarily complicated net type of mounting of the cushioning lining in the hard shell which mounting limits the utility of the helmet and its cushioning characteristics.

Accordingly, the main object of the present invention is to provide a hard shell protective helmet having a thick cushioning lining so constructed and so mounted within the shell as to be useable to contain a portable radio with an earphone and a battery, without material loss of its cushioning capacity.

Another important object of the present invention is to provide a protective helmet of the type described wherein the tuning and volume controls of a radio contained therein are readily available on the exterior of the helmet.

A further important object of the present invention is to provide a protective helmet of the type described wherein ready access to the battery of a radio contained therein is had by means of a door positioned in and forming a part of the protective helmet.

A still further important object of the present invention is to provide a novel protective helmet in which one or more earphones are positioned in its cushioning lining and are detachably connected by means of a plug to a radio, tape player, etc. mounted on a motorcycle, etc. or in the clothing of the user, and to the lining itself.

Other objects and advantages of the present invention will become apparent during the course of the following description.

In the drawings, I have shown two embodiments of the invention. In these showings:

FIG. 3 is an elevational view showing the padding arranged in a single plane and the mounting of the radio, wiring, earphone and battery thereon;

FIG. 4 is a fragmentary vertical sectional view taken on the line 4—4 of FIG. 3;

FIG. 6 is an elevational view showing the padding of the helmet of FIG. 5 as having a pair of earphones therein connected to its female plug.

Figure 1:
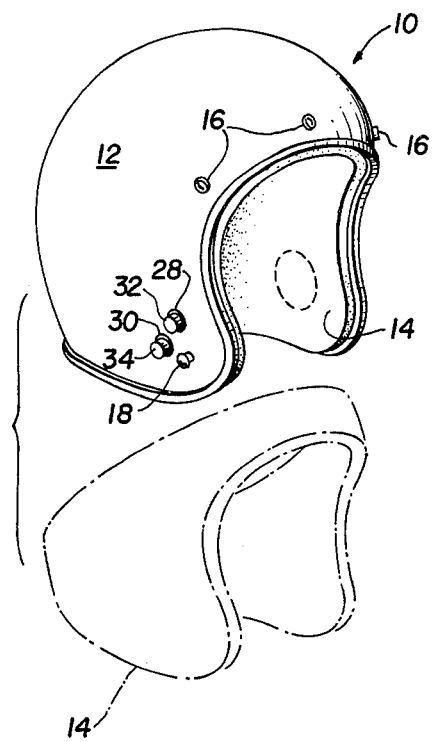
FIG. 1 is a perspective view of the helmet of the present invention with its protective padding in place and also showing in phantom the position of the padding when in the helmet.

Referring now to the drawings, numeral 10 designates the protective helmet as a whole which comprises the rigid shell 12 and the soft resilient padding 14 which is folded from the position shown in FIG. 3 to that shown in FIG. 1 before and after its insertion in and adhesion to the rigid shell 12.

The shell 12 is preferably formed of a solidified molded plastic such as vinyl resin, or cellulose acetate, or any suitable analagous functioning, solid hard plastic. Conventionally, the outer surface of the shell 12 is provided with three spaced female fasteners 16 in the forehead area for the reception of the male fasteners of a protective, transparent face shield (not shown). A stud 18 for the reception and anchoring of the end of a chin strap is rigidly mounted in the shell 12 in each of the cheek areas.

The cushioning pad 14 may be formed of any desired soft resilient material such as foam rubber, closed cell vinyl, etc. and the side which contacts the wearer's head is preferably covered with any durable fabric 19 which should be dark in color to absorb light and not show dirt from wear. The pad 14 may be adhesively installed or removably installed as its ends 17 are in a tight abutting relationship.

Figure 2:
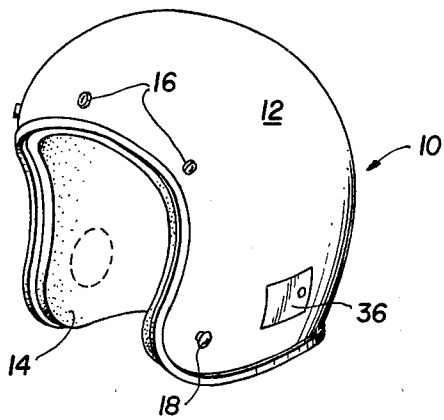
FIG. 2 is a similar view showing the other side of the helmet.
Figure 5:
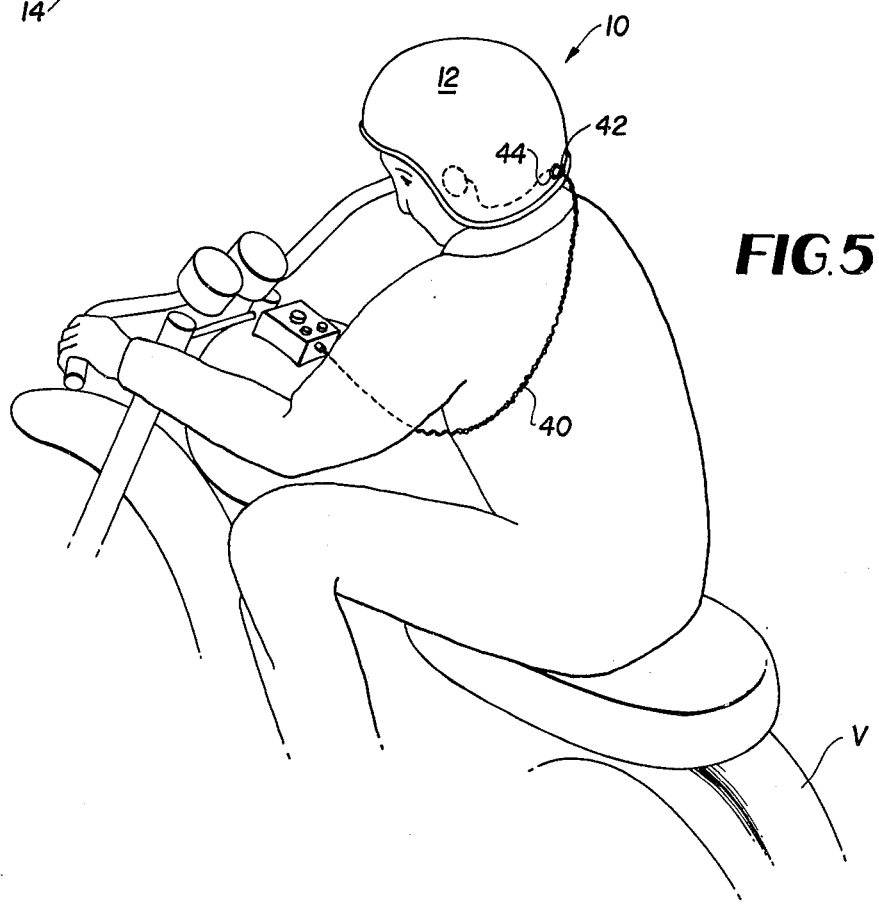
FIG. 5 is a diagrammatic view showing that a radio or tape player may be mounted on a vehicle and connected to an earphone in a padded helmet by a cord plugged thereinto.

While the cushioning liner pad may be of a single thickness, as shown in FIG. 4, two layers are shown which enhances the installation and securing of the radio 20, wiring 22, earphone 24, and battery 26 therein. As seen in FIG. 1, the shell 12 is provided with a pair of apertures 28 and 30 through which the tuning and volume controls 32, 34 of the radio 20 project as well as through apertures in the padding 14. Similarly, the shell 12 is provided with a battery replacement access door 36 as shown in FIG. 2 and the battery is contained under a flap (not shown) in the pad 14.

It will now be readily apparent that the combination radio helmet functions as a protective helmet as before and without the addition of material weight, provides entertainment, etc. as desired to the wearer by merely operating the controls 32 and 34.

In the form of the invention shown in FIG. 6 wherein like parts bear like numbers, the cushion pad 14 is provided with two earphones 24 and are connected by wiring 22 to an electrical connection plug which may be a male or a female electrical connection plug 38 mounted in one end of the pad 14 and projecting through a hole 44 in the shell 12. This enables the mounting of a radio, stereo, etc. on a vehicle such as a motorcycle, or in the wearers clothing, and its connection by wiring 40 and a male plug 42 to the female plug 38 in the shell 12 and padding 14.

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:

1. The combination with a rigid protective helmet constructed and arranged to enclose the forehead, sides and adjacent supporting neck of a wearer's head, one of the sides of the helmet having adjacent apertures for the projection of volume and tuning controls therethrough and the opposite side thereof being provided with an outwardly opening access door; of a thick unitary cushioning pad constructed and arranged to be detachably mounted on the inner peripheral edge surface of said helmet; said unitary pad being substantially symmetrical and having a central portion adapted to engage the forehead and side portions adapted to engage the inner side portions of said helmet; one of said side portions having a radio with tuning and volume controls mounted therein and positioned so that said controls project through said apertures; and an ear phone and a battery positioned in the other of said side portions and being electrically connected with said radio and with each other; said battery being positioned in the outer portion of said pad adjacent said access door for ready replacement thereof.

* * * * *